United States Patent [19]

Jaroschek et al.

[11] Patent Number: 5,443,378
[45] Date of Patent: Aug. 22, 1995

[54] APPARATUS FOR THE SANDWICH METHOD OF INJECTION MOLDING

[75] Inventors: Christoph Jaroschek, Engingen; Reinhard Steger, Freiburg; Wolfgang Nesch, Lahr-Sulz; Alexander Gehring, Bahlingen; Karlheinz Bourdon, Reute, all of Germany

[73] Assignee: Ferromatik Milacron Maschinenbau GmbH, Malterdingen, Germany

[21] Appl. No.: 272,483

[22] Filed: Jul. 11, 1994

[51] Int. Cl.⁶ .................................. B29C 45/16
[52] U.S. Cl. .................. 425/130; 264/328.17; 425/557; 425/558; 425/560; 425/574
[58] Field of Search ............... 425/130, 557, 558, 559, 425/560, 561, 574; 264/328.1, 328.17, 349

[56] References Cited

U.S. PATENT DOCUMENTS

| | | | |
|---|---|---|---|
| 3,888,612 | 6/1975 | Schrewe et al. | 425/130 |
| 4,090,836 | 5/1978 | von der Ohe et al. | 425/574 |
| 4,715,802 | 12/1987 | Arai | 425/130 |
| 4,722,679 | 2/1988 | Farrell | 425/146 |
| 4,978,493 | 12/1990 | Kersemakers et al. | 264/255 |
| 5,034,177 | 7/1991 | Niimi et al. | 264/328.17 |
| 5,215,762 | 6/1993 | Eder et al. | 425/130 |
| 5,286,184 | 2/1994 | Nakayama | 425/130 |
| 5,366,366 | 11/1994 | Yokohama | 425/558 |

FOREIGN PATENT DOCUMENTS 0419911 9/1990 European Pat. Off. .

OTHER PUBLICATIONS

Jaroschek, "New Ways With the Sandwich Method of Injection Molding", Kunststoffe/German Plastics, vol. 83, Jul. 1993.

*Primary Examiner*—Tim Heitbrink
*Attorney, Agent, or Firm*—Stephen H. Friskney

[57] ABSTRACT

A standard injection molding machine is combined with an auxiliary plasticizing unit having a hot runner manifold that can be alternately connected with or disconnected from the main injection unit of the molding machine to perform sandwich molding. The injection unit retracts from the mold to connect with a hot runner and receive skin material from a non-reciprocating screw extruder directly into the barrel of the injection unit. The injection unit then disconnects from the hot runner and moves back into position for injection into the mold. Simultaneously with this movement, the injection unit plasticizes sufficient core material to complete the stacked arrangement of skin and core material necessary for sandwich molding. In an alternate embodiment, the sandwich molding apparatus includes an accumulator with a suitable valve and connections to the other components to supply a final shot of skin material into the mold, as well as provide the pack and hold functions of the injection cycle.

5 Claims, 3 Drawing Sheets

PLASTICIZING

INJECTION

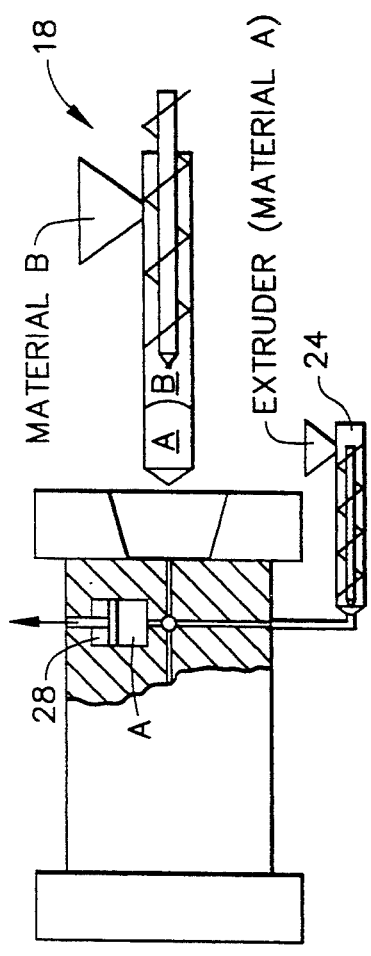
FIG. 3
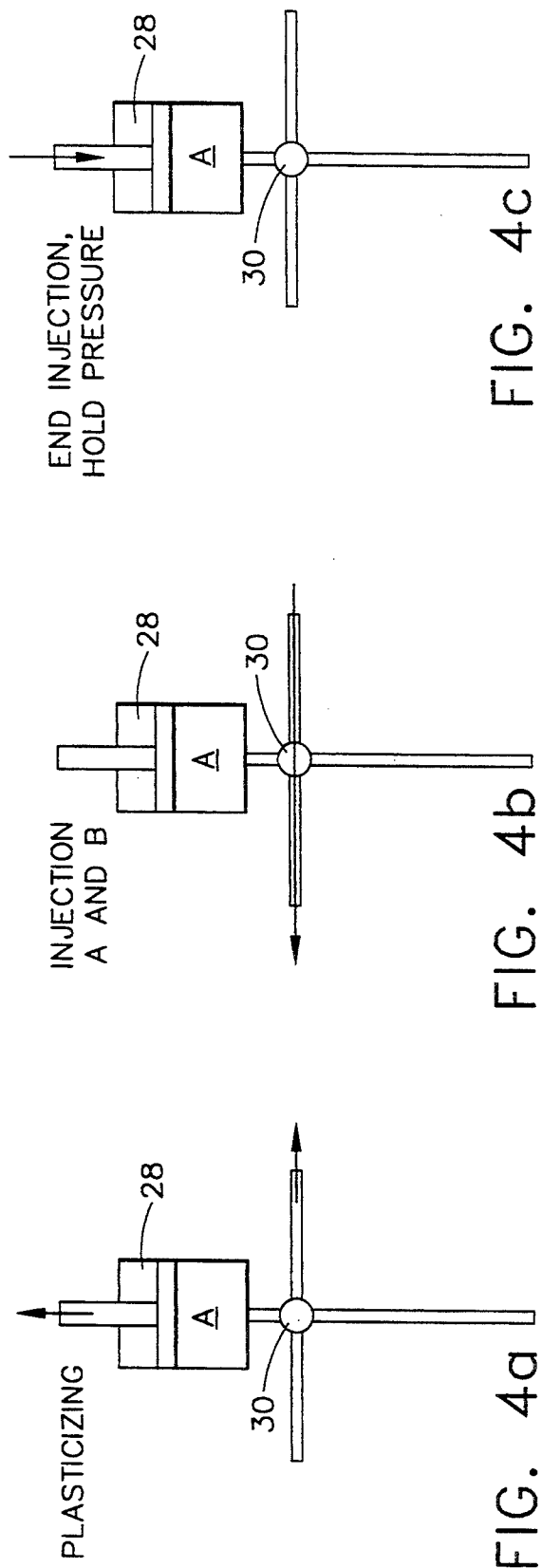
FIG. 4a
FIG. 4b
FIG. 4c

APPARATUS FOR THE SANDWICH METHOD OF INJECTION MOLDING

BACKGROUND OF THE INVENTION

1. Field of the Invention

The present invention relates to injection molding machines, and more particularly to an injection molding apparatus capable of producing multiple layer plastic articles having a sandwich layer configuration.

2. Description of the Related Art

The sandwich method of injection molding enables the production of plastic articles whose cross-section has a three-layer configuration. The outer or "skin" surface is one material, and the inner or "core" structure consists of another material. This construction has often been used for thick walled components whose cores consist of foamed material, and in applications where an inexpensive material can be used for the core of an article (replacing an expensive material) the requires special properties at the surface. More recently, there has been an increased emphasis on recycling which has prompted many molders to look for ways to use reground material. The sandwich method of molding can effectively use reground material as the core material since it still has adequate physical properties. This construction takes advantage of the fact that the outer (skin) material is relatively thin, thereby helping reduce the cost of the molded article by minimizing the amount of virgin material.

From a material processing point of view, the sandwich configuration is achieved when the two materials are conveyed one after the other into the mold cavity. When the materials are injected under laminar flow conditions, the injected melt begins to solidify immediately when it has made contact with the mold wall so that the melt at the center of the flow advances faster than the melt in the vicinity of the mold wall. Accordingly, material injected later displaces material injected earlier, particularly in the middle of the cross-section of the flow stream, while the melt that contacts the cold mold walls solidifies to form and maintain the surface layer of the part. When the subsequent melt flow includes a second material, the sandwich or three-layer configuration is created.

Because of the laminar flow pattern, it is not possible to injection mold a sandwich configuration by introducing both melts into the mold cavity at the same time. Simultaneous injection would result in unacceptable surface since the core material would contact the walls of the mold cavity and mix with the skin material at the surface of the molded article. To ensure the proper surface layer the skin material is always injected first with the sandwich molding method; the core material then follows at a short timed overlap. The overlap in injection of the two materials is necessary to prevent the melt flow front from momentarily stopping which would result in surface blemishes ("knit lines". With this type of timed sequence, it is immaterial whether the melts are brought together in a concentric or parallel nozzle. In all cases, however, the second (core) material must be a subsequent melt stream that flows through the flow cross-section of the first injected material in order to form the sandwich configuration.

Typically, injection molding apparatus designed to produce the sandwich configuration have employed two injection units, controlled to inject the respective component materials into the mold cavity in the desired timed sequence. Machines of this type have disadvantages involving the high initial cost of the required components and associated control capability for close operation monitoring to ensure that the volume flow of material is constant through the nozzle into the cavity when changing from the skin material to the core material. More recently, it has been discovered that the sandwich molding method does not necessarily require that the two melts be injected at different times from separate injection cylinders. It is also possible to layer the melts in a single cylinder and then inject these "stacked" melts into the mold cavity in a single injection stroke. This method of sandwich molding has the advantage of allowing the injection process to be set in the same way as standard (single material) injection molding.

The apparatus to perform the single injection method would typically comprise a standard injection molding machine having a main injection unit that receives plastic melt from one or more auxiliary plasticizing units. The transfer of the skin and core material into the main injection unit is controlled to achieve a total shot of the two stacked materials in the desired proportions. For this method, the auxiliary plasticizing unit can be a non-reciprocating screw extruder connected to a main injection unit having a reciprocating screw for injection. Alternatively, the auxiliary unit could be a second reciprocating screw injection unit where the screw operates in the normal manner to transfer material into the main injection unit; or two extruders supplying an injection accumulator.

SUMMARY OF THE INVENTION

An object of the present invention is to provide an apparatus of simplified and economical construction particularly adapted to production of articles molded by the sandwich method of injection molding.

The above stated objective is accomplished by combining a standard injection molding machine with an auxiliary plasticizing unit having a hot runner manifold that can be alternately connected with or disconnected from the main injection unit of the molding machine. In the preferred embodiment, the skin material is transferred from a non-reciprocating screw extruder through a hot runner manifold directly into the nozzle/barrel of the machine's injection unit. The hot runner manifold is connected directly to the barrel of the extruder, forming in essence an extension of the extruder barrel. Preparation for injection begins by retracting the injection unit away from the mold after the prior injection cycle is completed. Specifically, the unit is retracted sufficiently to allow connection with the hot runner manifold of the extruder. The hot runner manifold is moved together with the extruder into position, ultimately achieving a fluid tight connection with the nozzle of the injection unit. In order to build a full shot of the skin and core materials for sandwich molding an article, the extruder acts to transfer the plasticized skin material through the hot runner and into the barrel of the injection unit, passing through the unit's injection nozzle. The injection unit then disconnects from the hot runner, the hot runner is moved (with the extruder) away from the injection unit, and the injection moves back into position for injection into the mold. Simultaneously with the movement of the components after the skin material has been transferred, the injection unit plasticizes sufficient core material to complete the stacked arrangement of skin and core material necessary for sandwich molding.

Depending on the size of the unit and operating space available for the machine, the extruder for the sandwich molding apparatus can be oriented vertically (at 90° to the injection unit) so that the hot runner is also moved vertically to establish connection with the injection unit. Alternatively, the extruder can be oriented so that it is rotated to a position approximately parallel to the injection with the hot runner manifold appropriately positioned in front of the injection unit when the unit has retracted to initiate material transfer.

In an alternate embodiment, the sandwich molding apparatus includes an accumulator to supply a final shot of skin material into the mold, as well as provide the pack and hold functions of the injection cycle. More specifically, the accumulator is connected to the extruder by suitable valving so that a quantity of skin material is transferred into the accumulator just after the primary charge of skin material is transferred into the injection unit barrel. As soon as the valving switches to fill the accumulator, the injection unit begins plasticizing the desired quantity of core material. The accumulator is connected by suitable means to the inlet of the mold cavity, so that after the injection unit has filled the mold cavity with the primary charge, the accumulator can transfer a small quantity of skin material to ensure that the core material is fully contained by the skin material, and that the cavity is properly packed. The associated valving also allows the accumulator to maintain the desired pressure on the material in the mold, while simultaneously enabling the injection unit to receive skin material from the extruder for the next injection cycle.

BRIEF DESCRIPTION OF THE DRAWINGS

FIG. 3 shows a diagrammatic section through an alternate embodiment of the present invention including a main injection unit, an auxiliary plasticizing unit and an accumulator.

FIGS. 4a-4c show a diagrammatic section through an accumulator and associated valve that are included in the embodiment of the present invention shown in FIG. 3.

DESCRIPTION OF THE PREFERRED EMBODIMENT

Figure 1A:
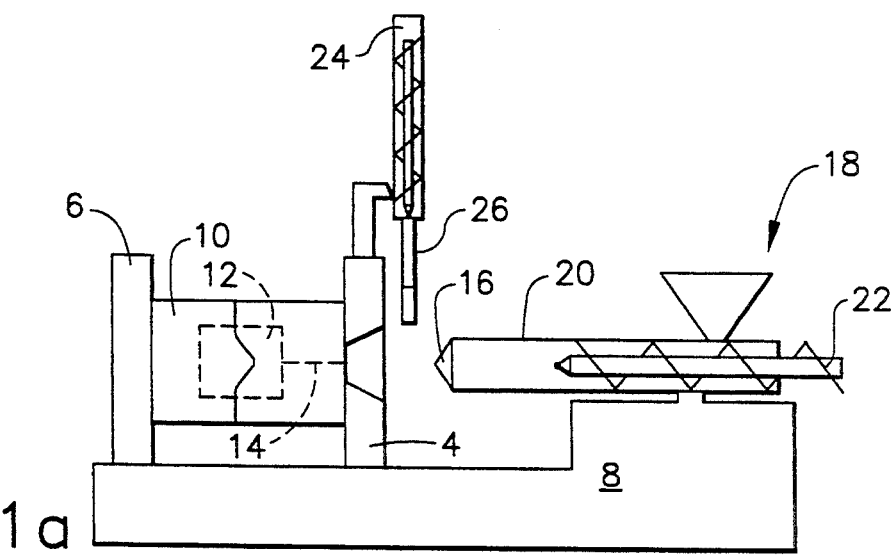
FIGS. 1a-1c show a diagrammatic section through an injection molding apparatus in accordance with the present invention having a main injection unit and a vertically oriented auxiliary plasticizing unit.
Figure 1B:
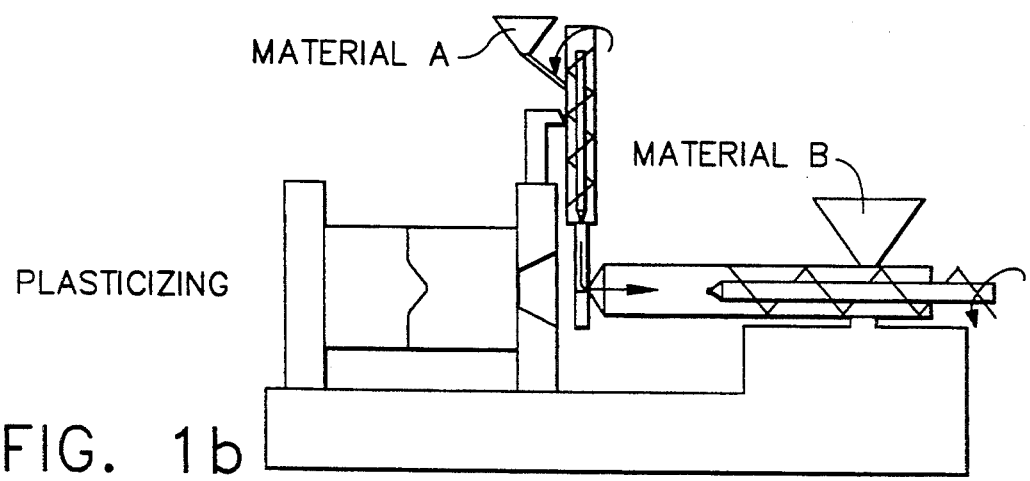
Figure 1C:
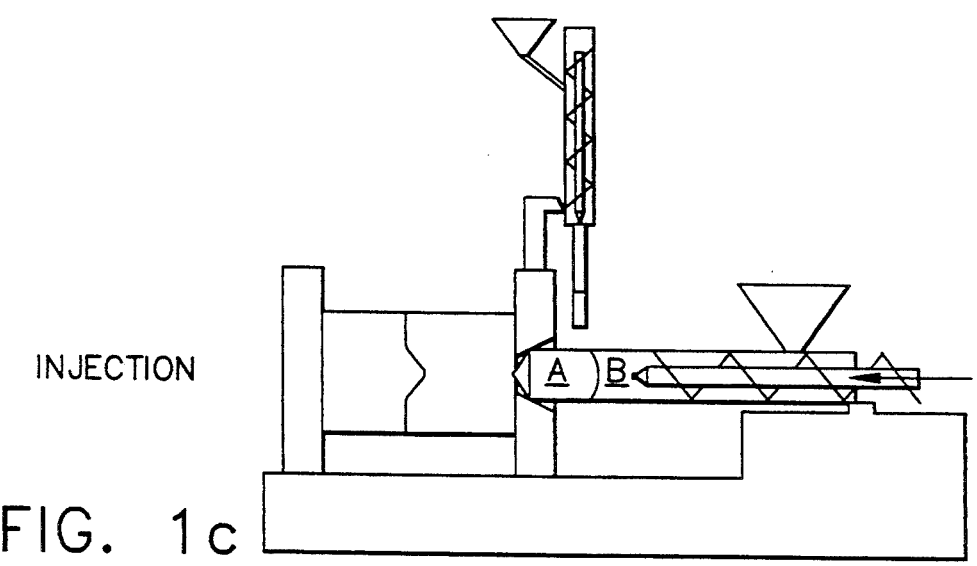

FIGS. 1a-1c show a two part mold 10 having a mold cavity 12 for receiving plastic melt from an injection unit 18 to produce a plastic article having a sandwich configuration. The two parts of the mold 10 are mounted on a stationary platen 4 and a moving platen 6. The stationary platen 4, moving platen 8 and injection unit 18 are supported by a common base 8. The mold construction includes a sprue channel 14 which is connected to a nozzle 16 on the injection unit 18 when material is injected into the mold cavity 12. The nozzle 16 is equipped with a shut-off valve (not shown) of the type that is well-known in the art.

The main injection unit 18 has a barrel 20 which includes a feed screw 22 of a configuration that is typical for injection molding. The feed screw is controlled to reciprocate in the barrel 20 to plasticize and inject plastic into the mold 10. The injection unit 18 is equipped with means, such as a hydraulic cylinder (not shown), to move the unit linearly toward and away from the mold 10. More specifically, the injection unit 18 is moved against the mold 11 for injection, then is retracted away from the mold 10 and stationary platen 4, so that the skin material can be fed into the injection unit barrel 20.

An auxiliary plasticizing unit 24 is mounted adjacent the injection unit 18 on either the. stationary platen 4 or base 8, depending on the desired machine configuration. Preferably, the auxiliary unit 24 is a non-reciprocating extruder to provide a more economical apparatus; however, it could also be a second reciprocating screw injection unit, if desired. Connected to the end of the auxiliary plasticizing unit 24 is a hot runner manifold 26. As seen in FIGS. 1a-1c, the auxiliary unit 24 is mounted on the stationary platen 4 so that it is capable of movement along a line perpendicular to the injection unit 18. This orientation of the auxiliary unit 24 facilitates its positioning so that the hot runner manifold 26 is properly aligned in front of the injection unit 18, enabling direct connection with the nozzle 16.

A cycle of operation will now be described according to the embodiment shown in FIGS. 1a-1c. The injection unit 18 is retracted to a rearward position (FIG. 1a), that provides clearance between the stationary platen 4 and the nozzle 16. The auxiliary unit 24 is then moved downward so that the hot runner manifold 26 is disposed in front of the injection unit 18. The nozzle 16 of injection unit 18 then moves against the hot runner manifold 26 to establish a fluid tight connection between the injection unit 18 and auxiliary unit 24. The auxiliary unit 24 is then activated to transfer plasticized material via the hot runner manifold 26, through the nozzle 16 and into the end of the barrel 20 of the injection unit 18, causing the screw 22 to move backward within the barrel. The transfer of the skin material from the auxiliary unit continues until a sufficient volume as defined by the part geometry has been transferred, see FIG. 1b.

When the transfer of skin material is complete, the injection unit 18 plasticizes a sufficient quantity of the core material by rotating and retracting the feed screw 22 in a conventional manner so that a full shot of melt is prepared. Simultaneously with the plasticizing function, the injection unit 18 disconnects from the auxiliary unit 24 by retracting slightly. The auxiliary unit 24 moves upward so that the injection unit 18 can now move forward unobstructed to a position where the nozzle 16 communicates with the sprue channel 14 of the mold 10. The injection unit 18 then injects the accumulated shot of core and skin material into the mold 10 by advancing the feed screw 22 in a manner typical of the injection molding process.

Figure 2A:
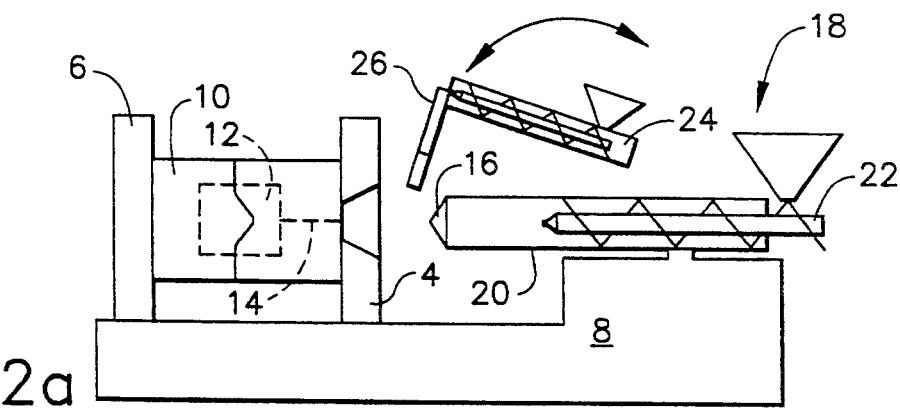
FIGS. 2a-2c show a diagrammatic section through a variation of the apparatus shown in FIG. 1; specifically, the auxiliary plasticizing unit is oriented differently with respect to the injection unit.
Figure 2B:
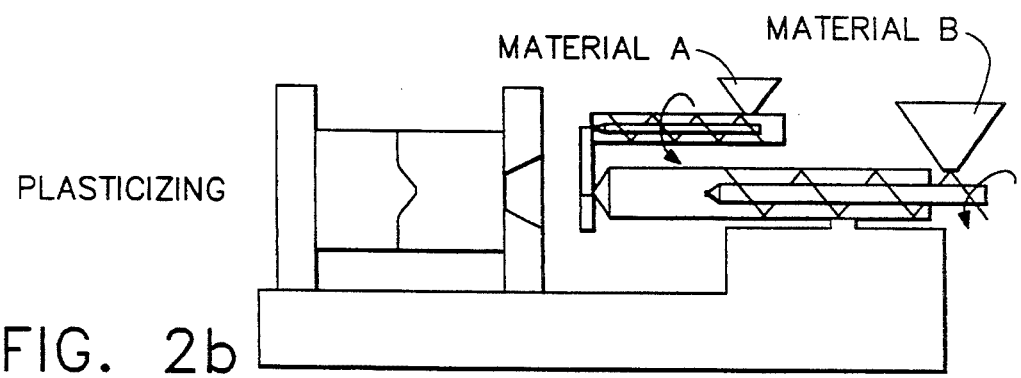
Figure 2C:
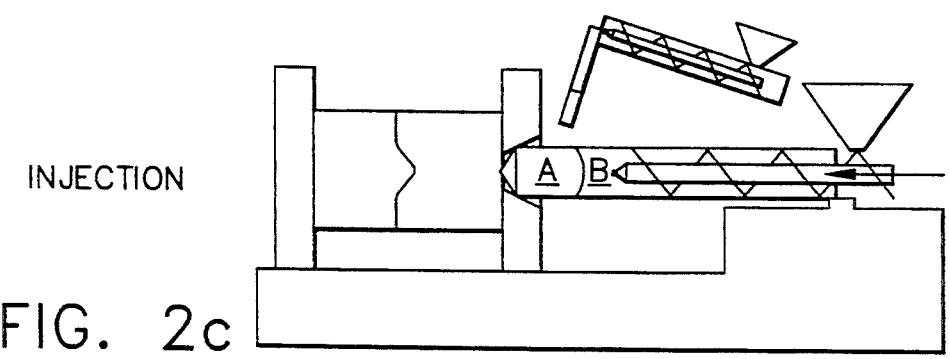

The apparatus of the preferred embodiment shown in an alternate configuration in FIGS. 2a-2c that is only slightly different from the structure shown in FIGS. 1a-1c. Specifically, rather than being vertically oriented, the auxiliary unit 24 is mounted in a manner that allows it to be parallel with the main injection unit 18 during the material transfer function. The auxiliary unit 24 and hot runner manifold 26 pivot or rotate from a position connecting the auxiliary unit 24 and the main injection unit 18 to a position that is sufficiently clear of the main injection unit 18 when it moves back and forth with respect to the stationary platen 4.

Accordingly, the operation of the alternate apparatus of FIG. 2a–2c is very similar to that shown in FIG. 1a–1c. The primary difference is the way that the auxiliary unit 24 and hot runner manifold 24 move in and out of position with respect to the main injection unit 18 to allow transfer of the skin material. More specifically, when the injection unit is retracted away from the mold (FIG. 2a), the auxiliary unit 24 and hot runner manifold 26 rotate into position so that the nozzle 16 of the main injection unit 18 is connected to the hot runner manifold 26 (FIG. 2b). This connection then allows transfer of the skin material from the auxiliary unit 24 through the hot runner 26 into the barrel 20 of the injection unit 18. When sufficient material is transferred, the hot runner 26 and auxiliary unit 24 are rotated to the clearance position and the main injection unit plasticizes the desired quantity of the core material as it moves into position against the mold (FIG. 2c). Once the full charge of melt has been accumulated, the injection unit 18 is ready to inject the stacked plastic melt into the mold cavity 12, forming the desired sandwich configuration for the molded article.

With either apparatus as shown in FIGS. 1a–1c and 2a–2c, the injection cycle includes time to fill and pack the mold cavity 12. Once the material in the sprue channel 14 has sufficiently hardened, the injection unit 18 retracts so that the hot runner manifold 26 can be connected as described earlier to allow for transfer of the skin material into the injection unit 18, and begin building a shot of material for the next cycle. As will be understood by those familiar with injection molding, various parts of the operation cycle overlap to minimize total cycle time. For example, after the skin material has transferred from the auxiliary unit 24 into the injection unit 18, the plasticizing of the core material would be simultaneous with the retraction of the hot runner 26 and subsequent movement of the injection unit 18 towards the mold 10. It is anticipated that in most cases, the necessary functions will overlap sufficiently so that "dead time" within the cycle is avoided or, at least, minimal.

The apparatus used in an alternate embodiment of the present invention is shown in FIGS. 3 and 4a–4c. The primary feature of this embodiment is the addition of an accumulator 28 and a flow control valve 30. The valve 30 in conjunction with suitable conduits enables connection of the accumulator 28 with the auxiliary plasticizing unit 24 and the mold cavity 12 via the sprue channel 14.

The accumulator 28 functions to supply a final shot of skin material into the mold 10 after injection of the stacked materials by the main injection unit 18. In addition, the accumulator 28 can be used to provide the pack and hold functions at the end of the injection cycle, allowing more flexibility in sequencing the elements of the injection cycle. In preparation for performing the desired functions, skin material is transferred into the accumulator 28 by the auxiliary unit 24 after the desired charge of skin material has been transferred into the injection unit 18. More specifically, upon completion of material transfer into the injection unit 18, the valve 30 is actuated to establish material flow from the auxiliary unit 24 to the accumulator 28. As soon as transfer of the skin material has been diverted to the accumulator 28, the injection unit 18 can begin plasticizing the desired quantity of core material. Alternatively, if the cycle timing allows, the material transfer into accumulator 28 could occur simultaneously with the transfer into the injection unit 18, or, with suitable valving, transfer could be delayed so that skin material is fed into the accumulator 28 by the injection unit 18 simultaneously with injection into the mold. In the latter case, it is important to control the rate of flow into the accumulator 28 in order to maintain the desired injection pressure profile at the mold.

As noted earlier, the accumulator 28 is also connected to the mold cavity 12. After the injection unit 18 has injected the primary charge of skin and core material to fill the mold cavity 10, valve 30 is actuated to establish the necessary connection, and the accumulator 28 is operated to pack the mold cavity 10 with a small charge of skin material. This final injection by the accumulator 28 not only makes sure the mold cavity 12 contains a fully formed article, but also ensures that the core material is fully contained or covered by the skin material. The accumulator 28 function continues after the injection by maintaining the mold pressure while the molded article cools. Since the pressure is held by the accumulator 28, the injection unit 18 is free to begin receiving skin material from the auxiliary unit in preparation for the next operating cycle.

While the invention has been illustrated in some detail according to the preferred embodiment shown in the accompanying drawings, and while various forms of the preferred embodiment has been described in some detail, there is no intention to thus limit the invention to such detail. On contrary, the invention is intended to include all modifications, alterations, and equivalents falling within the spirit and scope of the appended claims.

We claim:

1. Apparatus for injection molding a plastic article in a mold cavity, the molded article having a sandwich layer configuration that includes an outer surface of a skin material surrounding an inner core material, comprising:

a main injection unit having a reciprocating feed screw for plasticizing the core material, an auxiliary unit for plasticizing the skin material, a hot runner manifold connected to the auxiliary unit, and means for alternately positioning the hot runner manifold between a first position wherein the hot runner is connected to the main injection unit and a second position wherein the hot runner does not obstruct positioning of the main injection unit, such that when the hot runner is in the first position, said skin material can be transferred from the auxiliary unit into the main injection unit.

2. The apparatus of claim 1 further comprising separate accumulator means for receiving a quantity of said skin material and injecting the skin material into the mold cavity after the main injection unit has completed injection into the mold cavity.

3. The apparatus of claim 2 wherein the accumulator means receives the skin material directly from the auxiliary unit.

4. The apparatus of claim 2 wherein the accumulator means receives the skin material from the material flow passing from the main injection unit to the mold cavity.

5. Apparatus for injection molding a plastic article in a mold cavity, the molded article having a sandwich layer configuration that includes an outer surface of a skin material surrounding an inner core material, comprising:

a main injection unit having a reciprocating feed screw for plasticizing the core material, an auxiliary unit for plasticizing the skin material, a hot runner manifold connected to the auxiliary unit, an accumulator, means for connecting the hot runner manifold to the main injection unit and the accumulator, and means for connecting the main injection unit and the accumulator to the mold cavity, such that skin material can be transferred from the auxiliary unit to the main injection unit and the accumulator, and both the main injection unit and accumulator can inject material into the mold cavity.

* * * * *